: (12) United States Patent
Kang et al.

(10) Patent No.: US 9,858,434 B2
(45) Date of Patent: Jan. 2, 2018

(54) SYSTEM AND METHOD FOR ERASING A STORAGE MEDIUM

(71) Applicant: Brainzsquare, Inc., San Jose, CA (US)

(72) Inventors: Seon Geun Kang, San Jose, CA (US); Jeong Hwan Park, Seoul (KR)

(73) Assignee: Brainzsquare Inc., San Jose, CA (US)

( * ) Notice: Subject to any disclaimer, the term of this patent is extended or adjusted under 35 U.S.C. 154(b) by 17 days.

(21) Appl. No.: 14/585,168

(22) Filed: Dec. 29, 2014

(65) Prior Publication Data

US 2016/0188249 A1 Jun. 30, 2016

(51) Int. Cl.
G06F 12/00 (2006.01)
G06F 21/62 (2013.01)
G06F 21/80 (2013.01)
G06F 9/44 (2006.01)

(52) U.S. Cl.
CPC .......... *G06F 21/6245* (2013.01); *G06F 21/80* (2013.01); *G06F 9/4401* (2013.01); *G06F 2221/2143* (2013.01)

(58) Field of Classification Search
CPC .... G06F 21/6245; G06F 21/80; G06F 9/4401; G06F 2221/2143
See application file for complete search history.

(56) References Cited

U.S. PATENT DOCUMENTS

| | | | | |
|---|---|---|---|---|
| 4,692,858 A * | 9/1987 | Redford | ................. | G06F 3/038 715/744 |
| 8,145,891 B2 * | 3/2012 | Edmiston | ................ | G06F 21/62 711/164 |
| 2001/0037450 A1 * | 11/2001 | Metlitski | ............ | G06F 12/1408 713/152 |
| 2004/0044890 A1 * | 3/2004 | Lim | ...................... | G06F 9/4406 713/2 |
| 2005/0091073 A1 * | 4/2005 | Harris | ....................... | G06F 8/61 703/21 |
| 2007/0150691 A1 * | 6/2007 | Illendula | ............. | G06F 12/0246 711/170 |
| 2012/0331552 A1 * | 12/2012 | Wenzinger | ................ | G06F 8/60 726/22 |
| 2015/0358321 A1 * | 12/2015 | Udagawa | ............ | H04L 63/0442 713/176 |

\* cited by examiner

*Primary Examiner* — Kalpit Parikh

(57) ABSTRACT

A method and system for erasing data stored in a storage medium of a computer system is disclosed. According to one embodiment, a booting parameter of an operating system of the computer system is changed to a data erasure program. After the computer system is rebooted, the data erasure program is launched, and a disk drive of the computer system is erased by overwriting with a pattern of data. The data erasure program runs in a native mode of the operating system prior to executing a file system check routine of the operating system.

25 Claims, 5 Drawing Sheets

SYSTEM AND METHOD FOR ERASING A STORAGE MEDIUM

FIELD

The present disclosure relates in general to the field of computer software and systems, and in particular, to a system and method for erasing a storage medium.

BACKGROUND

Computers include one or more disk drives to store data. The stored data in a disk drive can be rewritten over the lifetime of the disk drive. Despite their relative longevity and reliability, many disk drives eventually fail and need to be replaced. In other cases, disk drives may need to be reformatted or recycled to be repurposed.

A failing disk drive may be returned to the manufacturer or replaced with a new disk drive. The disk drive of a computer may be overwritten or wiped out prior to being overwritten to install a new operating system or recycled for other users. When the disk drive needs to be replaced, repurposed, or returned to the manufacturer, the company has an elevated concern that sensitive data stored on the disk drive may be unknowingly leaked to a third party. Sensitive business information and data from customers or partners may be stored on the disk drive, and the company may be legally liable for a loss or leak of the sensitive data. If such sensitive data is leaked to a competitor or a hacker, their business may be severely disrupted. Moreover, there are regulations and specifications enforced by government or military requiring destruction of data before a disk drive is removed.

Data erasure software is largely divided into enterprise software and personal uses. If a company with 10,000 employees needs to replace computers for their employees every five years, 2000 computers need to be replaced annually. In this case, the IT department of the company needs an enterprise data erasure solution that is capable of erasing hundreds or thousands of computer disk drives at a high speed, monitoring data erasure processes, and generating reports.

Personal data erasure software targets personal users. A user plugs in a universal serial bus (USB) drive including the personal data erasure software into a computer and runs the software from the USB drive. However, personal data erasure software may not need features of the enterprise software such as reporting and management features. The personal data erasure software may not be a viable solution in an enterprise environment because a large number of computers are managed over the network. The data erasure for those computers cannot be done by connecting a USB drive to each of the computers, and the limited number of IT staff cannot manage the entire data erasure processes.

SUMMARY

A method and system for erasing data stored in a storage medium of a computer system is disclosed. According to one embodiment, a booting parameter of an operating system of the computer system is changed to a data erasure program. After the computer system is rebooted, the data erasure program is launched, and a disk drive of the computer system is erased by overwriting with a pattern of data. The data erasure program runs in a native mode of the operating system prior to executing a file system check routine of the operating system.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
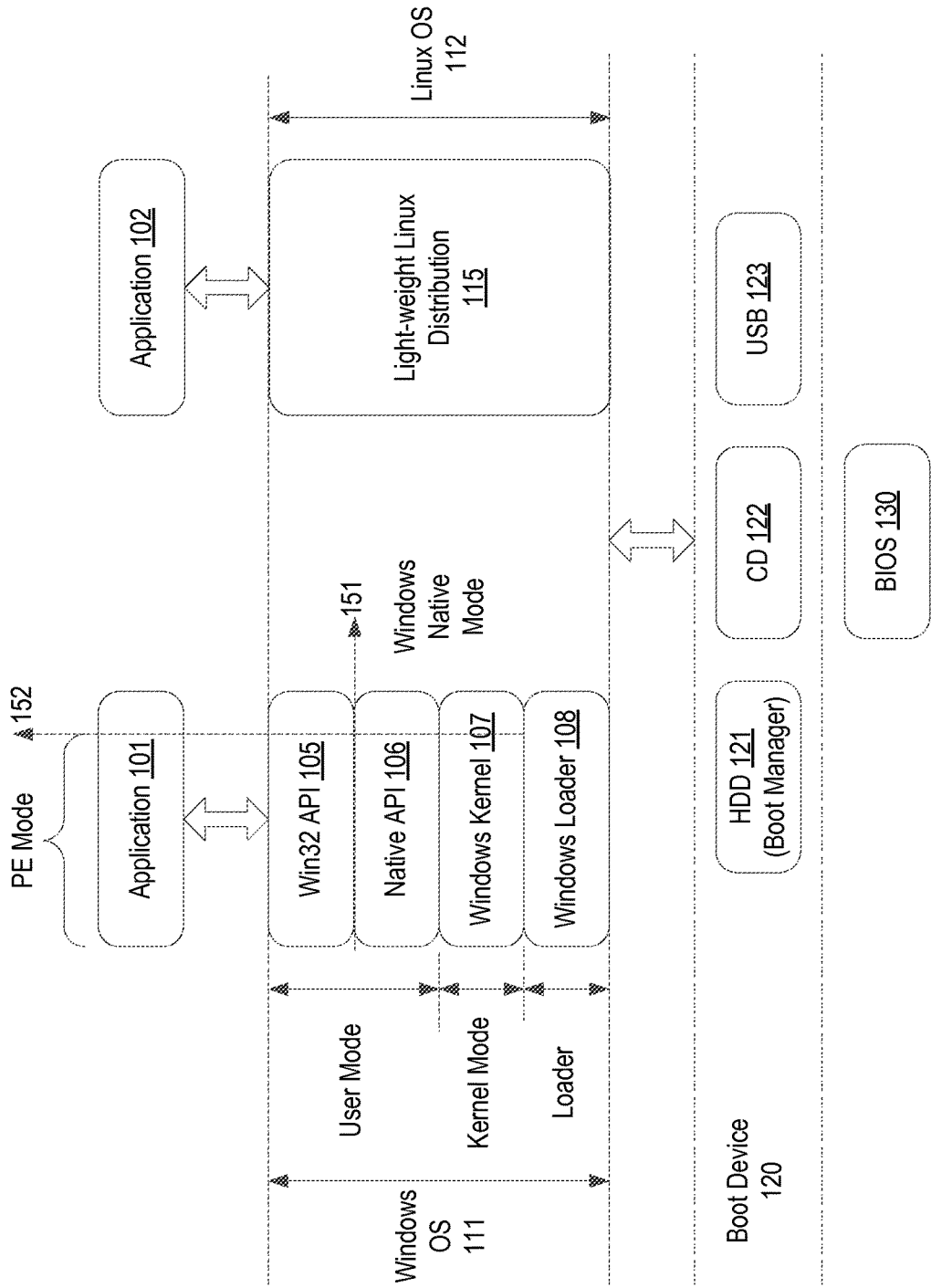
FIG. 1 illustrates a schematic diagram of an exemplary data erasure system and method that is configured to run in a native mode of a computer system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A method and system for erasing data stored in a storage medium of a computer system is disclosed. According to one embodiment, a booting parameter of an operating system of the computer system is changed to a data erasure program. After the computer system is rebooted, the data erasure program is launched, and a disk drive of the computer system is erased by overwriting with a pattern of data. The data erasure program runs in a native mode of the operating system prior to executing a file system check routine of the operating system.

Each of the features and teachings disclosed herein can be utilized separately or in conjunction with other features and teachings to provide a method and system for managing the frequency of online advertisement placements. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A computer system described herein may be a desktop, a laptop, a tablet PC, a smartphone, a mobile computer, a server, or any other computing device that has at least one data storage medium, herein also referred to as a disk drive. The data storage medium may be an internal hard disk drive (HDD), an external HDD, a solid-state device (SSD), a flash memory, USB drive, or any other storage medium that is accessible by the computer system for data read and write. The storage medium such as an SSD, a flash memory, or a USB memory contains no actual disk, nor a drive motor to spin a disk. However, the term, disk drive, may be exchangeably used herein to encompass both non-drive storage medium such as SSD as well as drive storage medium such as a hard disk drive.

According to one embodiment, the present system and method allows a user to erase a disk drive of a computer by downloading a data erasure program over the network. In this case, there is no need to plug in a memory device that contains a data erasure program to a computer. After downloading the data erasure program, the user can execute the data erasure program directly from the computer that contains the disk drive to erase. The data erasure program can be stored in the disk drive to be erased. After the data erasure program is run, the data erasure program is also erased from the disk drive. The data erasure program receives a permission (e.g., data erasure policy) to erase a designated disk attached to the computer from a license manager over the network.

According to one embodiment, the present system and method allows a user who does not possess administrator's privilege to erase a disk drive. This is useful when the user does not have the administrator's privilege or did not login as an administrator when executing a data erasure program. The data erasure policy permits the administrator to manage the data erasure process remotely and permits the user to execute the data erasure process according to the data erasure policy.

According to one embodiment, the present system and method provides a data erasure program for an offline use. In this case, a memory device is connected to the computer, and a data erasure program is executed from the memory device.

According to one embodiment, the present system and method allows a user to erase a disk drive of a non-bootable computer. In this case, a memory device is connected to the computer, and the computer is booted from the memory device. After the computer is booted from the memory device, a data erasure program is executed from the memory device.

According to one embodiment, the present system and method provides a data erasure program that can erase a disk drive that is installed with a dissimilar operating system. For example, a memory device is connected to a computer installed with Mac OSX, and the computer is booted from the Windows PE image stored in the memory device.

According to one embodiment, the present system and method provides a management tool for data erasure policy. The policy management is critical to allow only an allowed user or an administrator to set up a disk erasure policy and erase a designated disk drive according to the disk erasure policy. This is useful for managing hundreds or thousands of computers and erasing disk drives connected to those computers simultaneously and/or remotely.

According to one embodiment, the present system and method provides disk management and visualization tools. The data erasure reports generated from both online and offline data erasure processes are congregated and stored in a central server for facilitating maintenance and status check.

The present system and method for data erasure is advantageous over prior art systems and methods in that a large number of computers can be erased simultaneously. The data erasure program is downloaded from the license management server over the network. Because the present system and method does not require rebooting of the computer after changing the BIOS parameters, the computer users who may not have the administrator's privilege can run the data erasure program. Many users can participate in the data erasure process at the same time, thus a large number of computers can run the data erasure program simultaneously resulting in saving cost and eliminating a need for a large space required to collect those computers and staff to run and manage the data erasure programs running on those computers.

For a computer installed with Windows OS, the system disk of the Windows OS also needs to be erased. However, once the computer is booted with the Windows OS, the system disk is protected from being erased. In this case, the disk drive may need be removed from the computer and erased from a second computer. The disk drive is connected to the second computer as a non-system disk, therefore the disk drive is not protected by the operating system of the second computer, thus can be erased. Alternatively, the computer including a disk drive to be erased may be booted from a secondary drive such as a USB drive or a CD ROM drive. This makes the secondary drive to boot as a system disk; therefore, the disk drive is not protected by the Windows OS, thus it can be erased. However, in this case, the BIOS of the computer may need to be edited to change the booting sequence or a booting drive. After the disk drive is erased, the BIOS needs to be manually restored the normal booting sequence of the booting drive.

Windows Preinstallation Environment (Windows PE) is a minimal Win32 operating system with limited services that is built on the Windows Vista kernel. Windows PE is often used to prepare a computer for Windows installation, to copy a disk image from a network file server, and to initiate Windows Setup. When Windows installation fails or Windows OS fails to boot, a USB drive installed with Windows PE is inserted into the computer, and the computer is booted from the USB drive. Once the Windows PE is booted, the system disk of the computer can be repaired or reinstalled. Instead of providing a separate CD ROM to repair the system disk, some computers have a repair OS image installed on the disk drive, from which the computer can boot in a Windows PE mode.

According to one embodiment, the present data erasure program runs in a Windows PE mode. The data erasure software may be distributed on a CD ROM or a USB drive. A user connects the CD ROM or USB drive to a computer including the disk drive to erase, and boots the computer from the connected CD ROM or USB drive in a Windows PE mode.

Application programs that are configured to run in a Windows PE environment can be developed using the Win32 API but their functionalities may be limited. For example, Windows 7 OS does not recognize a RAID disk in Windows PE environment that is visible in a normal operating condition. In order to recognize the RAID disk, the user has to install a RAID disk driver after booting the computer in the Windows PE.

In a native mode, Windows OS does not support higher-level non-native APIs such as Win32 API. With the lack of Win32 API, application programs that are configured to run in a native mode may not utilize features and functions of the operating system that are programmer/user friendlier. However, because the supported functions provided at Windows kernel level are the same as Windows OS, the RAID disk can be recognized without a need for installing a driver. Therefore, the native mode is easier for an ordinary user to work in to change and write data on disk drives.

Moreover, Windows PE cannot be distributed by application developers as a third part application due to the license agreement of Windows PE. There are also intrinsic limitations imposed by running a data erasure program intended to run in a Windows PE environment. For example, the Windows PE is forced to be rebooted after 72 hours to prevent that the computer is run for other purposes than Windows PE is intended for. Therefore, the data erasure process must be completed within 72 hours. However, data erasure by writing a series of patterns (e.g., 35 patterns by Gutmann method) may require over 72 hours to complete. In addition, Windows PE requires a driver to be installed to recognize a certain type of disk drives such as a RAID disk.

FIG. 1 illustrates a schematic diagram of an exemplary data erasure system and method that is configured to run in a native mode of a computer system, according to one embodiment. The computer system has a BIOS 130 and one or more boot devices 120 including, but not limited to, a hard disk drive 121, a CD ROM drive 122, and a USB drive 123. The computer system is installed with an operating system such as Windows OS 111 or Linux OS 112. Although FIG. 1 shows the examples of a Windows OS and a Linux OS, it is apparent that the present system and method can be applied to any other computer operating system without deviating from the scope of the present disclosure. Windows OS 111 includes Windows loader 108, Windows kernel 107, Windows API 106, and Win32 API 105. A computer installed with Windows OS 111 can be configured to run in a kernel mode, and a user mode. Windows kernel 107 is provided in the kernel mode whereas native API 106 and Win32 API 105 are supported in the user mode.

The axis 151 symbolically represents the availability of API functions of the Windows OS 111 running in a Windows PE mode. In the Windows PE mode, only limited kernel, native and Win32 API functions of the Windows OS 111 are available to an application 101. In the Windows PE mode, the user interfaces looks similar to the normal Windows mode, however some device drivers, for example, the device drivers for the hard disk drive 121, the CD ROM 122, and the USB drive 123, may not be available, thus limiting the capability of the application 101. In this sense, the axis 151 is referred to as an axis of "driver fidelity." If Windows PE cannot boot from a specific boot device 120 (e.g., the HDD 121, CD ROM 122, and USB 123), the application 101 installed on the boot device 120 may not be available.

The axis 152 symbolically represents the availability of API functions of the Windows OS 111 running in Windows native mode. In the Windows native mode, both the full-fledged Windows kernel 107 and native API functions 106 are supported, however Win32 API functions 105 are not available. In this sense, the axis 152 is referred to as an axis of "GUI fidelity" because Win32 API provides the majority of the graphical user interface (e.g., Windows Explorer) environment that an ordinary user is familiar with.

Similarly, Linux OS 112 may have a limitation of the availability of device drivers or the completeness of a user interface environment depending on a mode of operation/version/variation under the Linux OS 112. For example, different versions of lightweight Linux distribution 115 may be available. Depending on the loaded version of the Linux distribution 115, some of the functions system calls or functions may not be available to an application 102 depending on the availability device drivers and the user interface.

Data erasure programs that run at an application level of Windows PE or Linux OS environment provides a good GUI fidelity because such environment supports a higher level of API functions including the GUI functions. However, those data erasure programs may have limited capability to access a certain device driver, for example, a RAID disk. In that case, a device driver needs to be installed and loaded after the computer system is booted to be able to recognize the RAID disk. The data erasure program that runs at the application level of Windows PE or Linux OS environment requires a boot manager to load the data erasure program stored in the Windows PE or Linux ISO image file.

The present system and method allows a computer to run a data erasure program in a native mode of the operation system to gain access a disk drive to erase. The present system and method has higher driver fidelity and recognizes any disk drive that the operating system recognizes. In addition, the present system and method does not require a separate booting device such as a CD ROM or a USB drive that contains a separate operating system other than the operating system installed on the computer. Contrary to the data erasure programs that run from a separate booting device or loaded from a boot manager of the computer, the data erasure program can be loaded and run from a disk drive that is to be erased. Since the present system and method runs in a native mode of the computer system, a text-based user interface may be provided, and a log file may need to be transferred from a different computer to a license management server or via a portable storage medium such as a USB device.

According to one embodiment, the present system and method provides a data erasure program that can be loaded and run from a disk drive to be erased. For Windows OS, the data erasure program reboots the computer in Windows native mode. Since the present data erasure program utilizes native APIs, the data erasure process can be performed without a time constraint (e.g., a 72-hour limit) of Windows PE environment or without changing the boot sequence or configuration or installing a driver to gain access to a disk drive to be erased. Furthermore, Windows PE mandates administrator's privilege to run any application. It is advantageous that the present system and method can be implemented without administrator's privilege. This makes the present system and method an appropriate enterprise solution where a large number of disk drives need to be erased simultaneously, and the computers may be physically dispersed, in which case the enforcement of administrator's privilege to each computer to run the data erasure program is not viable.

Figure 2:
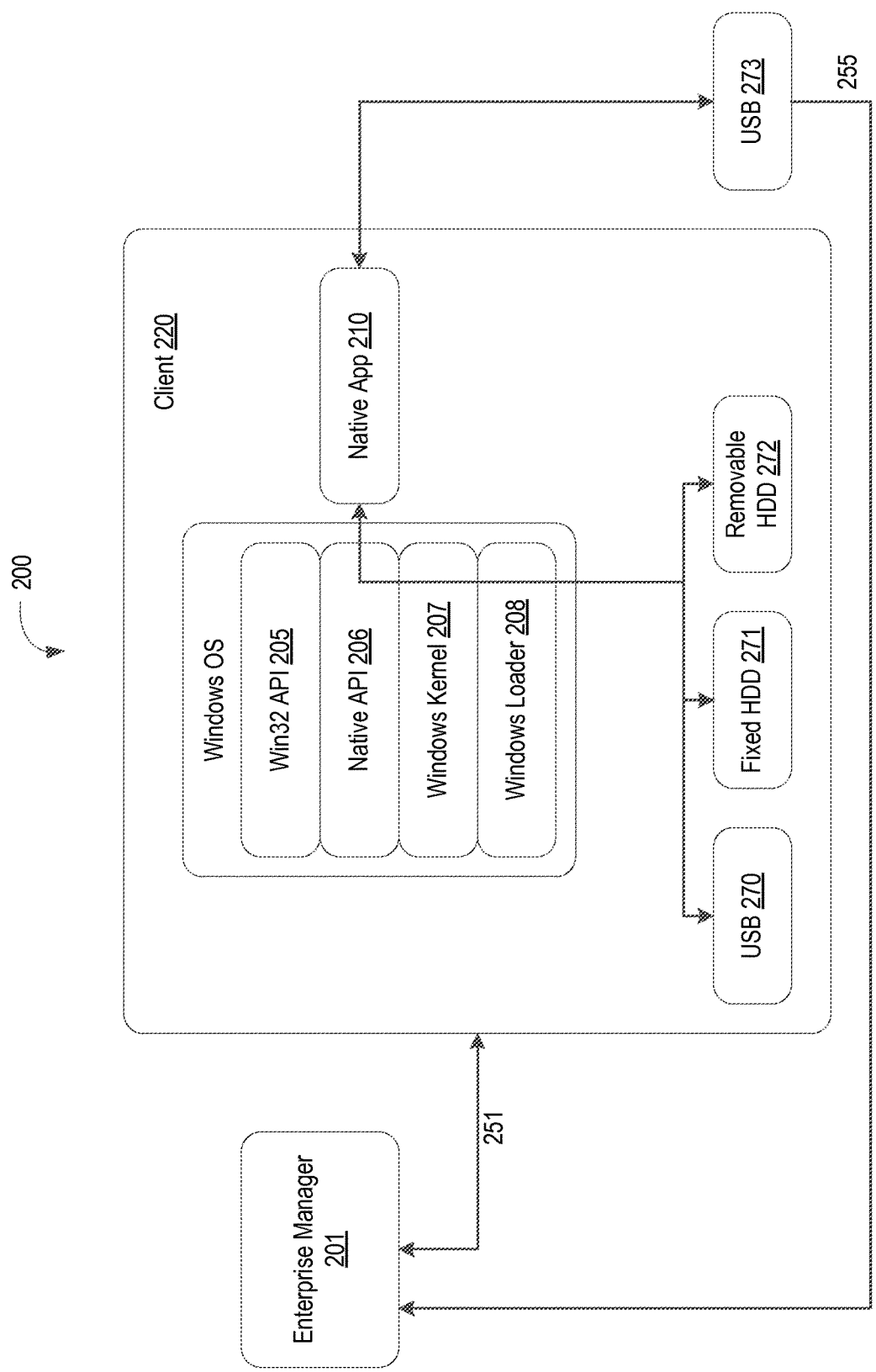
FIG. 2 illustrates a schematic diagram of an exemplary data erasure process, according to one embodiment.

The present system and method provides various features to monitor and manage data erasure processes running on a large number of computers. FIG. 2 illustrates a schematic diagram of an exemplary data erasure process, according to one embodiment. The system 200 includes an enterprise manager 201, a client computer 220 installed with Windows OS, and a native application program 210 that runs in a native mode of Windows OS. The enterprise manager 201 provides various management tools including, but not limited to, a license management tool, a disk management tool, and a reporting tool for an administrator of the enterprise manager 201. Although the present example shows the case of Windows OS installed on the client computer 220, it is apparent that any other OS that supports a native mode or a low-level API mode (e.g., lightweight Linux distribution) may be loaded and run by the client computer 220. The client computer 220 is connected with one or more of a USB drive 270, a fixed hard disk drive (HDD) 271, and a removable HDD 272, or other storage drives to be erased.

A user of the client computer 220 downloads the native application program 210 and data erasure policy from the enterprise manager 201 via 251 over the network and stored them in the disk drive of the computer system, for example, on a desktop or in a program folder. The user executes the native application program 210, and the client computer 220 reboots after the booting execute registry value is changed. After being rebooted, the client computer 220 executes the native application program 210 in the Windows native mode and starts the data erasure process on a designated disk or disks of the computer according to the data erasure policy.

According to one embodiment, the data erasure policy includes a version of the application program 210 (e.g., 3.0.2.322), a parameter to force the entire disk drive erasure (e.g., ON for entire disk erasure, OFF to allow a partial disk erasure), a parameter for disk erasure algorithm (e.g., ON for administrator-specific algorithm, OFF for user-specified algorithm), and an identifier of a disk erasure algorithm (e.g., Overwrite by constant, Overwrite by constant and verification, DOD 5220.22-M(E) 3 times overwrite, DOD 5220.22-M(E) 3 times overwrite and verification, DOD 5220.22-M(E) 7 times overwrite, DOD 5220.22-M(E) 7 times overwrite and verification, Gutmann's 35 times overwrite, and Gutmann's 35 times overwrite and verification.

In the case where the client computer 220 connected to the enterprise manager 201 over the network, the administrator of the enterprise manager 201 can send a command over the network to launch the native application program 210. For example, the administrator creates a group policy object (GPO) and remotely install an msi file on the client computer 220. In this case, the user of the client computer 220 does not have to enter a security code to execute the native application program 210, and the administrator remotely can execute the native application program 210.

For an offline use, the user of the client computer 220 loads the native application program 210 locally from a removable drive (e.g., USB drive 273, a CD ROM (not shown)) that is connected to the client computer 220. A client computer that is not bootable or failed to boot can be booted from the removable drive. The user of the client computer 220 loads the native application program 210 from the removable drive and runs it to start the data erasure process.

According to one embodiment, the removable drive may also contain the data erasure policy issued by the administrator of the enterprise manager 201. For a security reason, the security code to execute the native application program 210 may be provided to the user via a different communication method such as an email or a text message. In addition to the security code, the data erasure policy may specify the manufacturer, the type, and the capacity of a disk drive to erase to prevent an accidental erasure of a wrong disk drive.

As the data erasure progress continues, the status of data erasure process is displayed and updated on the display of the client computer 220. After the data erasure program is finished according to the data erasure policy, a log file is created and saved to the USB drive 273. The log file can be transmitted from a different computer to the enterprise manager 201 over a network via various data transfer protocols such as an email or a text message. In another embodiment, the USB drive 272 that stores the log file is physically transported to the enterprise manager 201, and the log data associated with the client computer 220 is updated on an enterprise database. Referring to the log file, the reporting tool of the enterprise manager 201 updates the status of the erased disk drive on the enterprise database and generates a report.

According to one embodiment, the log file is updated and saved to the USB drive 273 during a disk erasure process multiple times before the disk erasure process is completely finished. In one embodiment, a progress log is continuously overwritten to at one or more locations of a disk drive (e.g., the end address of the disk drive) at a specific interval (e.g., a multiplicity of disk drive offsets. The progress log is saved to the USB drive 273 before it is erased with a predetermined data pattern. The location where the progress log is saved and the interval of progress log update may be specified by the data erasure policy or a user before the disk erasure process starts. If a disk erasure process fails or aborted for any reason, the disk erasure process can resume without repeating the whole process. For example, if a Gutmann's 35 times overwrite method fails after 30 times of overwrites, then the administrator refers to the progress log and continues the remaining 5 times of overwrites instead of repeating the whole 35 times overwrites.

Figure 3:
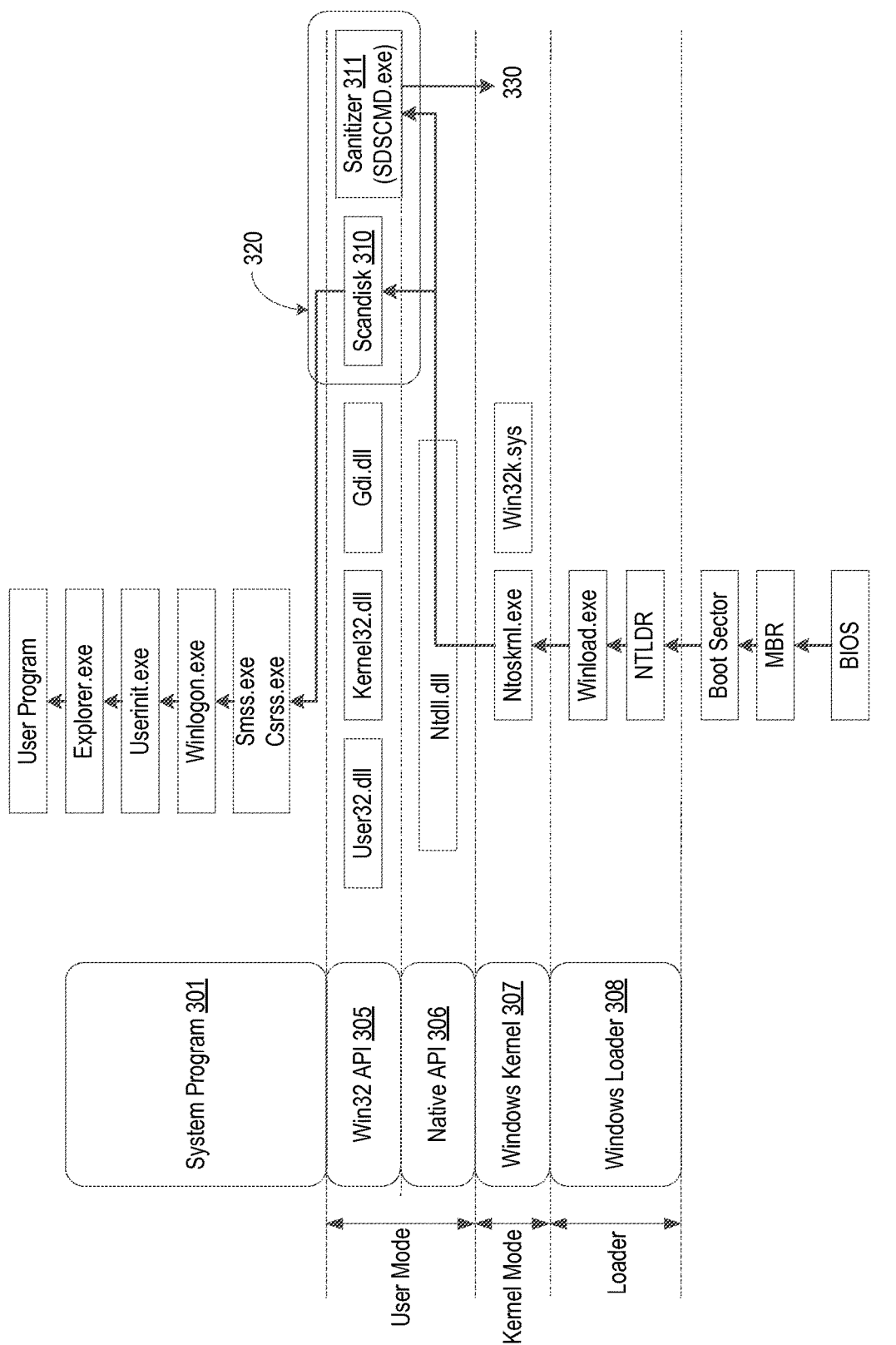
FIG. 3 illustrates an exemplary process for executing a data erasure program, according to one embodiment.

FIG. 3 illustrates an exemplary process for executing a data erasure program, according to one embodiment. A system program 301 calls Win32 API functions 305, and Win32API 305 is built on native API 306. When a computer starts, the BIOS of the computer refers to the master boot record (MBR) for instructions and information as to how to proceed with the boot process, loads a boot sector identified by the MBR, and load the operating system using Windows loader 308. Winload.exe of Windows loader 308 loads the Windows kernel 307, and Ntdll.dll of native API 306 calls Win32 API functions including a disk scanning utility Scan-Disk 310. ScanDisk 310 is a diagnostic utility included in Windows OS that checks and repairs file systems errors on a disk drive. Instead of ScanDisk 310, CHKDSK was used in MS-DOS and earlier versions of Windows OS. Once the computer is booted, the session manager subsystem (smss.exe), client/server runtime subsystem (csrss.exe), and windows logon (winlogon.exe) are called. After the user logs in, winlogon.exe runs userinit.exe and explorer.exe, and user application programs run afterwards.

After the system program 301 is loaded, a system disk (e.g., C drive of the computer) is protected, therefore an attempt to erase the system disk will be denied. During the modified booting sequence, a data erasure program, herein also referred to as Sanitizer or SDSCMD.exe is executed instead of ScanDisk 310 or prior to calling ScanDisk 310. Sanitizer 311 reboots the computer before the system program 301 utilizing Win32 API 305 is loaded.

Figure 4:
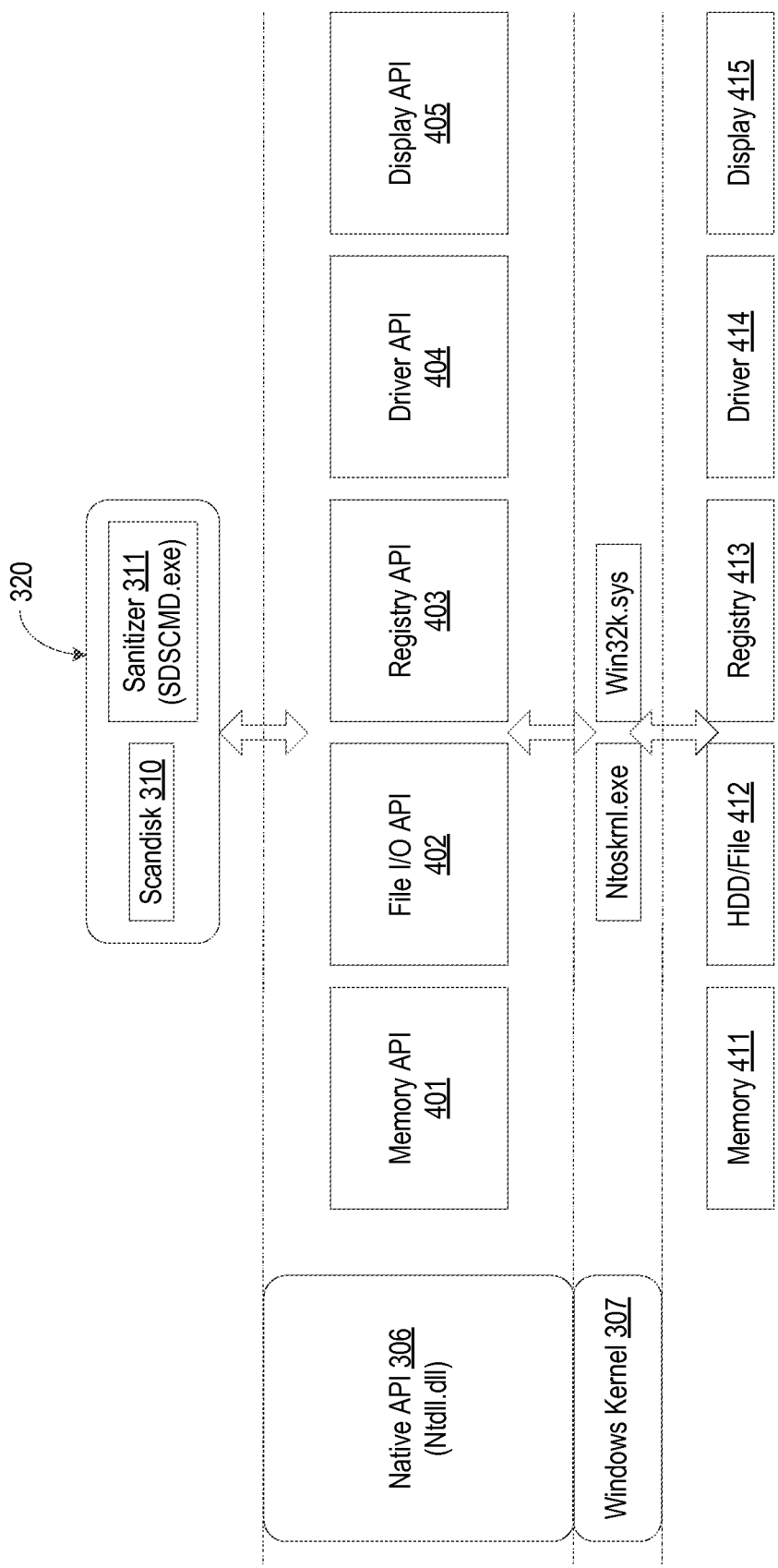
FIG. 4 illustrates a schematic diagram of the present data erasure system and method, according to one embodiment.

FIG. 4 illustrates a schematic diagram of the present data erasure system and method, according to one embodiment. Sanitizer 311 uses various API functions including the memory API 401, the file I/O API 402, the registry API 403, the device driver API 404, and the display API 405 that respectively provide interfaces to a memory device 411, a hard disk drive (HDD) 412, registry 413, device drivers 414, and a display device 415 of the computer system. Examples of the memory API 401 include, but are not limited to, RtlAllocateHeap, RtlFreeHeap, RtlCreateHeap, RtlDestroyHeap, NtAllocateVirtualMemory, and NtFreeVirtualMemory. Examples of the file I/O API 402 include, but are not limited to, NtCreateFile, NtOpenFile, NtReadFile, NtWriteFile, and NtClose. Examples of the registry API 403 include, but are not limited to, NtCreateKey, NtOpenKey, NtQueryValueKey, NtSetValueKey, and NtClose. Examples of the device driver API 404 include, but are not limited to, NtLoadDriver. Examples of display API 405 include, but are not limited to, NtDisplayString. The native API 306 interfaces with the memory device 411, the hard disk drive (HDD) 412, registry 413, device drivers 414, and the display device 415 of the computer system via Windows kernel 307, for example, Ntoskrnl.exe and Win32k.sys.

Figure 5:
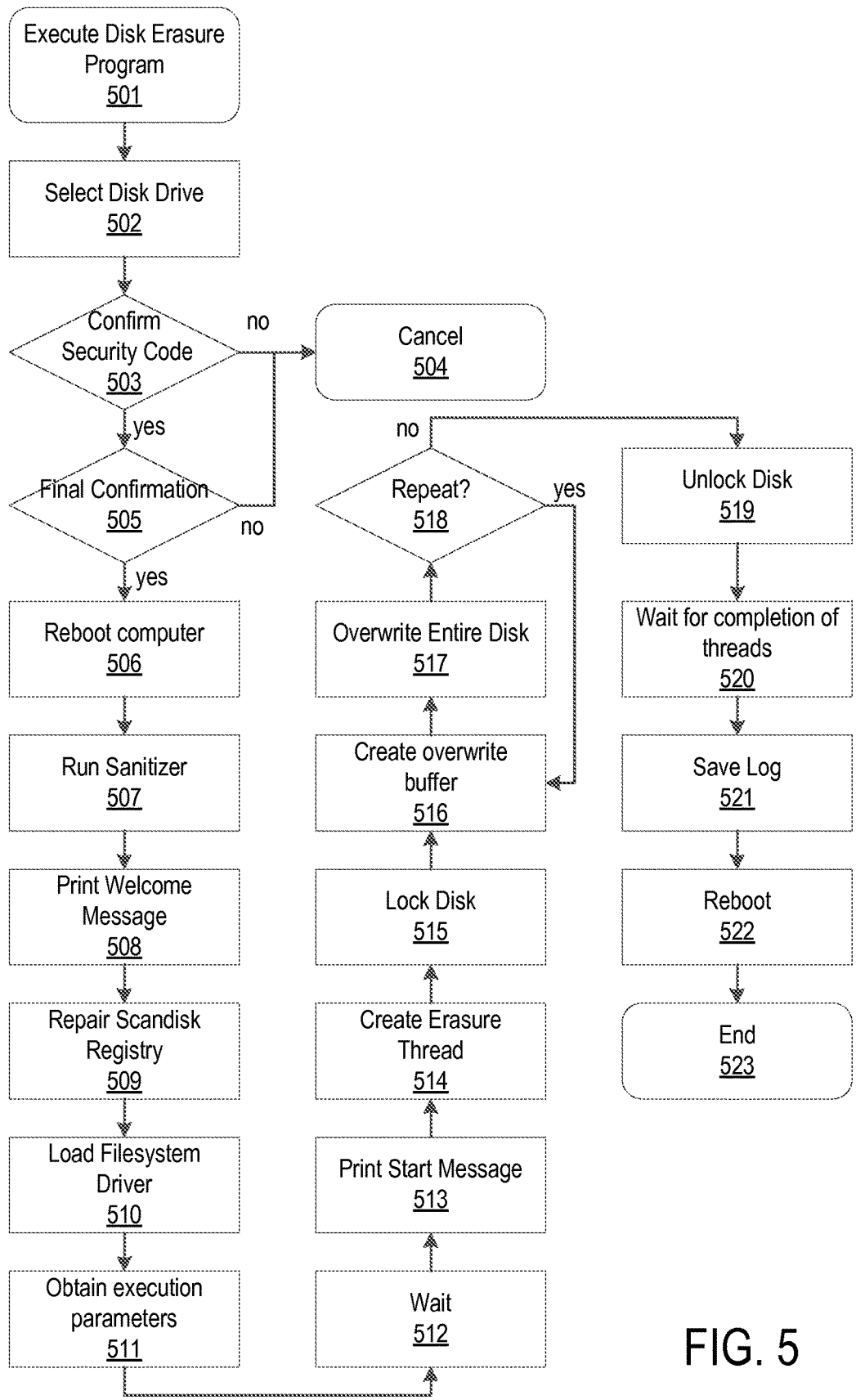
FIG. 5 illustrates an exemplary data erasure process, according to one embodiment.

FIG. 5 illustrates an exemplary data erasure process, according to one embodiment. A data erasure program is executed by the user, or a remote administrator of the computer (501). The remote administrator may send a command to the computer over a network to run a scheduled execution of the data erasure program at a specified date and time. The user (or the remote administrator) selects a disk drive to erase (502). The user is prompted to confirm a security code (503). In one embodiment, the security code is included in the data erasure policy issued by the administrator. The security code prevents the user from accidentally erasing a disk drive that may store important data and gives the user an opportunity to back up data prior to starting the data erasure process. In the case of Windows OS, the booting execution registry value for "HKLM\SYSTEM\CurrentControlSet\Control\Session Manager\BootExecute" is changed from an initial value that is associated with ScanDisk, for example, "autocheck autochk *" to the file name of Sanitizer data erasure program "SDSCMD.exe." A backup booting execution registry "BootExecuteBackup" is created and the original registry value of the "BootExecute", "autocheck autochk *" is copied to the backup registry. The original booting execution registry value is restored using the backup registry value after the Sanitizer program is launched to allow the computer system to boot normally after the data erasure process is completed and the computer system is rebooted. An additional registry, for example, "HKLM\SYSTEM\CurrentControlSet\Control\Session Manager\SDSCMDPARAM" may be created to store the information regarding the disk drive such as the manufacturer, the disk drive name, the memory capacity, as well as the information of the computer system and the user who execute the Sanitizer data erasure program. This information may be used when creating a log file during or after the disk erasure process.

After entering the security code, the user is prompted with a final confirmation to start the data erasure process (505). A message is displayed that the computer will be rebooted, and the power should not be disconnected to the computer system during the data erasure process. Once the registry information for "BootExecute" is changed to "SDSCMD.exe", the Sanitizer program will starts even after the power is reset by pressing the power button of the computer system. After the user's reconfirmation, the computer system is rebooted (506) and the Sanitizer program is started (507).

After the computer system is rebooted, a welcome message, for example, "Welcome to SECUDRIVE Sanitizer" is printed to the display of the computer system by calling NtDisplayString of the native API (508). Since the Sanitizer program runs in a native Windows mode, the welcome message is displayed in a plain text. The booting execution registry information for BootExecute is restored to the original value using the backup booting execution registry value (509). The registry repair calls several native API functions, for example, NtOpenKey, NtQueryValueKey, NtSetValueKey, and NtClose. This allows the computer system to boot normally after the data erasure process successfully completed or in a case when the data erasure fails or is canceled so that ScanDisk runs instead of SDSCMD.exe when the computer is rebooted. The file system driver is loaded (510) to save a log file to a removable storage device such as a USB drive that is connected to the computer system. Prior to executing the data erasure process, Fastfat and NTFS file system drivers are loaded. The data erasure program is ready to start by collecting the execution parameters (511). Such execution parameters include, but are not limited to, the information of the disk drive to be erased, and the information about the PC and the user that is available from the registry. A predetermined period, for example, 10 seconds (512) is allowed to the user, during which the data erasure process can be canceled.

A start message is printed to the display of the computer system (513). One or more data erasure threads are created (514). In one embodiment, the number of threads created corresponds to the number of disk drives to be erased. Within each data erasure thread, a data erasure thread function (e.g., EraseOneDriveThread) is called. A parameter passed to the data erasure thread function includes at least the identifier of the disk drive to be erased. The disk drive(s) to be erased is/are locked (515) except for the Sanitizer program SDSCMD.exe that can access and overwrite data on the disk drive during the data erasure process.

The Sanitizer program creates an overwrite buffer (516). The overwrite buffer may be filled with a constant or random numbers depending on the disk overwrite method specified by the data erasure policy or an algorithm chosen by the user. Data is overwritten on each of the memory blocks of the disk drive, and the entire disk drive is overwritten with the overwrite buffer (517). For a random number overwrite method, the overwrite buffer is filled with random numbers may be used for the entire memory blocks of the disk drive or refreshed with random numbers each time a memory block of the disk drive is overwritten. The random overwrite buffer may be used more than once to save the time to create random numbers for each memory block. For multiple overwrite methods, the steps 516-518 are repeated (518). The overwrite buffer may be changed to a different series of constants each time the disk drive is overwritten. A pseudo code for a constant value overwrite look as follows:

| Const | SF_OverWriteConst(nDrive, 0x00); |
|---|---|

A pseudo code for DoD3 (3 times overwrite) and DoD7 (7 times overwrite) looks as follows:

| DoD 3: | SF_OverWriteDoD3( int nDrive ) |
|---|---|
| | SF_OverWriteConst(nDrive, '\x00'); |
| | SF_OverWriteConst(nDrive, '\xff'); |
| | SF_OverWriteRandom(nDrive, 1); |
| DoD 7: | SF_OverWriteDoD7( int nDrive ) |
| | SF_OverWriteDoD3(nDrive); |
| | SF_OverWriteConst(nDrive, '\x40'); |
| | SF_OverWriteDoD3(nDrive); |

After the entire disk is overwritten by the number of overwrites specified by the data erasure policy, the disk drive is unlocked (519). The Sanitizer program waits for the completion of all data erasure threads created at 514 (520). A log file is saved to a memory device such as a USB drive that is connected to the computer system. For identifying the USB drive, the Sanitizer program opens possible drive characters (e.g., A-Z) using NtOpenFile and recognizes a drive character that succeeds opening as the drive of the USB device and saves the log file to the USB device (521). The information contained in the log file includes, but is not limited to, the information of the disk drive, the computer system, and the user, and the results of the data erasure (e.g., success, fail, and abort). The computer system reboots (522), and the data erasure process is completed (523).

The examples described above apply to Windows OS and Linux, however it is apparent that the present system and method can be applied to any other operating system including MAC OS, ANDROID, FIRE OS, without deviating from the scope of the present disclosure. These operating systems check the file system of a computer system during the booting sequence and fix errors if necessary. For example, Windows OS uses ScanDisk and Linux uses the command fsck. Since these operating systems can fix errors during the booting sequence, the file system can be written (or overwritten). The present system and method erase the memory device of a computer system by intercepting a normal file system check routine of the operating system and overwrites the memory device with constant or random data.

A system and method for erasing a storage medium has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:
1. A computer-implemented method comprising:
storing a data erasure program in a disk drive of a computer system;
changing a booting parameter of a host operating system of the computer system to the data erasure program;
rebooting the computer system after storing the data erasure program in the disk drive of the computer system;
loading the host operating system of the computer system after rebooting the computer system;
launching the data erasure program from the disk drive of the computer system after loading the host operating system of the compute system but prior to executing a file system check routine of the host operating system, wherein a system disk of the computer system is erasable before the file system check routine of the host operating system is executed and is protected from being erased after the file system check routine of the host operating system is executed; and
erasing the disk drive of the computer system including the system disk of the computer system that stores the host operating system by overwriting data written on the disk drive with a pattern of data.

2. The method of claim 1, further comprising:
generating a security code associated with the disk drive; and
receiving the security code from the user to launch the data erasure program.

3. The method of claim 1, further comprising:
issuing a data erasure policy associated with the disk drive;
receiving the data erasure policy from an enterprise manager; and
erasing the disk drive of the computer system according to the data erasure policy.

4. The method of claim 3, further comprising creating a log file after the disk drive is erased according to the data erasure policy.

5. The method of claim 4, further comprising storing the log file in a database and generating a report.

6. The method of claim 1, wherein the pattern of data includes a series of a constant number or random numbers.

7. The method of claim 1, further comprising:
creating a data erasure thread for the disk drive;
allowing the data erasure thread to access the disk drive; and
locking the disk drive from another thread other than the data erasure thread.

8. The method of claim 1, further comprising creating a plurality of data erasure threads based on a number of disk drives to erase.

9. The method of claim 1, further comprising repeating the step of erasing the disk drive by overwriting the disk drive with the pattern of data a plurality of times.

10. The method of claim 8, further comprising changing the pattern of data each time the disk drive is overwritten.

11. The method of claim 1, wherein the host operating system is a Windows operating system, and wherein the booting parameter is associated with ScanDisk.

12. The method of claim 1, further comprising:
storing an original booting parameter of the host operating system; and restoring the booting parameter with the original booting parameter prior to running the data erasure program.

13. The method of claim 1, further comprising downloading the data erasure program from a remote server over a network.

14. A non-transitory computer readable medium having stored thereon computer-readable instructions, which instructions when executed by a processor cause the processor to perform operations comprising:
   storing a data erasure program in a disk drive of a computer system;
   changing a booting parameter of a host operating system of the computer system to the data erasure program;
   rebooting the computer system after storing the data erasure program in the disk drive of the computer system;
   loading the host operating system of the computer system after rebooting the computer system;
   launching the data erasure program from the disk drive of the computer system after loading the host operating system of the compute system but prior to executing a file system check routine of the host operating system, wherein a system disk of the computer system is erasable before the file system check routine of the host operating system is executed and is protected from being erased after the file system check routine of the host operating system is executed; and
   erasing the disk drive of the computer system including the system disk of the computer system that stores the host operating system by overwriting data written on the disk drive with a pattern of data.

15. The non-transitory computer readable medium of claim 14, wherein the computer-readable instructions cause the processor to perform further operations comprising:
   generating a security code associated with the disk drive; and
   receiving the security code from the user to launch the data erasure program.

16. The non-transitory computer readable medium of claim 14, wherein the computer-readable instructions cause the processor to perform further operations comprising:
   issuing a data erasure policy associated with the disk drive;
   receiving the data erasure policy from an enterprise manager; and
   erasing the disk drive of the computer system according to the data erasure policy.

17. The non-transitory computer readable medium of claim 16, wherein the computer-readable instructions cause the processor to perform further operations comprising creating a log file after the disk drive is erased according to the data erasure policy.

18. The non-transitory computer readable medium claim 17, wherein the computer-readable instructions cause the processor to perform further operations comprising storing the log file in a database and generating a report.

19. The non-transitory computer readable medium of claim 14, wherein the computer-readable instructions cause the processor to perform further operations comprising
   creating a data erasure thread for the disk drive;
   allowing the data erasure thread to access the disk drive; and
   locking the disk drive from another thread other than the data erasure thread.

20. The non-transitory computer readable medium of claim 14, wherein the computer-readable instructions cause the processor to perform further operations comprising creating a plurality of data erasure threads based on a number of disk drives to erase.

21. The non-transitory computer readable medium of claim 14, wherein the computer-readable instructions cause the processor to perform further operations comprising repeating the step of erasing the disk drive by overwriting the disk drive with the pattern of data a plurality of times.

22. The non-transitory computer readable medium of claim 21, wherein the computer-readable instructions cause the processor to perform further operations comprising changing the pattern of data each time the disk drive is overwritten.

23. The non-transitory computer readable medium of claim 14, wherein the host operating system is a Windows operating system, and wherein the booting parameter is associated with ScanDisk.

24. The non-transitory computer readable medium of claim 14, wherein the computer-readable instructions cause the processor to perform further operations comprising:
   storing an original booting parameter of the host operating system; and
   restoring the booting parameter with the original booting parameter prior to running the data erasure program.

25. The non-transitory computer readable medium of claim 14, wherein the computer-readable instructions cause the processor to perform further operations comprising downloading the data erasure program from a remote server over a network.

* * * * *